United States Patent
Cheng et al.

(10) Patent No.: US 9,031,684 B2
(45) Date of Patent: May 12, 2015

(54) MULTI-FACTOR ADVANCED PROCESS CONTROL METHOD AND SYSTEM FOR INTEGRATED CIRCUIT FABRICATION

(75) Inventors: Nai-Han Cheng, Hsinchu (TW); Chin-Hsiang Lin, Hsin-Chu (TW); Chi-Ming Yang, Hsian-San District (TW); Chun-Lin Chang, Jhubei (TW); Chih-Hong Hwang, New Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 683 days.

(21) Appl. No.: 13/286,337

(22) Filed: Nov. 1, 2011

(65) Prior Publication Data
US 2013/0110276 A1 May 2, 2013

(51) Int. Cl.
| | |
|---|---|
| *G06F 19/00* | (2011.01) |
| *G06F 17/50* | (2006.01) |
| *H01L 29/00* | (2006.01) |
| *H01L 27/082* | (2006.01) |
| *H05K 1/00* | (2006.01) |

(52) U.S. Cl.
CPC ........ *G06F 17/5063* (2013.01); *G06F 2217/10* (2013.01)

(58) Field of Classification Search
CPC .......... G05B 13/04; G06F 19/00; H01L 21/66
See application file for complete search history.

(56) References Cited

U.S. PATENT DOCUMENTS

| | | | | |
|---|---|---|---|---|
| 5,926,690 | A * | 7/1999 | Toprac et al. | 438/17 |
| 6,381,564 | B1 * | 4/2002 | Davis et al. | 703/22 |
| 6,665,623 | B1 * | 12/2003 | Pasadyn et al. | 702/84 |
| 7,035,696 | B1 * | 4/2006 | Sadeghi et al. | 700/31 |
| 2002/0045146 | A1 * | 4/2002 | Wang et al. | 432/49 |
| 2002/0055804 | A1 * | 5/2002 | Betawar et al. | 700/117 |
| 2002/0103563 | A1 * | 8/2002 | Izawa et al. | 700/121 |
| 2003/0163295 | A1 * | 8/2003 | Jakatdar et al. | 703/14 |
| 2003/0225471 | A1 * | 12/2003 | Tseng et al. | 700/108 |
| 2003/0229881 | A1 * | 12/2003 | White et al. | 716/19 |
| 2005/0071039 | A1 * | 3/2005 | Mitrovic | 700/121 |
| 2006/0265098 | A1 * | 11/2006 | Gould et al. | 700/121 |
| 2011/0010215 | A1 * | 1/2011 | Lin et al. | 705/8 |
| 2011/0153055 | A1 * | 6/2011 | Sheu et al. | 700/121 |

OTHER PUBLICATIONS

"Control of Lithography in Semiconductor Manufacturing", Model-based Run-to-Run Controllers for Improved Yields, IEEE, 2006, pp. 46-55.*
Unpublished U.S. Appl. No. 12/731,348, filed Mar. 25, 2010 entitled "Dynamic Compensation in Advanced Process Control", 19 pages.

* cited by examiner

*Primary Examiner* — Robert Fennema
*Assistant Examiner* — Thomas Stevens
(74) *Attorney, Agent, or Firm* — Haynes and Boone, LLP (57) ABSTRACT

A method and system for integrated circuit fabrication is disclosed. In an example, the method includes determining a first process parameter of a wafer and a second process parameter of the wafer, the first process parameter and the second process parameter corresponding to different wafer characteristics; determining a variation of a device parameter of the wafer based on the first process parameter and the second process parameter; constructing a model for the device parameter as a function of the first process parameter and the second process parameter based on the determined variation of the device parameter of the wafer; and performing a fabrication process based on the model.

16 Claims, 5 Drawing Sheets

MULTI-FACTOR ADVANCED PROCESS CONTROL METHOD AND SYSTEM FOR INTEGRATED CIRCUIT FABRICATION

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. However, such scaling down introduces challenges in maintaining process variations at acceptable levels within a wafer, wafer to wafer, and lot to lot. For example, as process geometries continue to decrease, critical dimension of features of a wafer are becoming continually smaller, and variations in the critical dimension across the wafer are increasing. As critical dimension variation increases, variation of performance characteristics of devices of the wafer also increase. For example, performance characteristics of transistors of a wafer, such as saturation drain current and threshold voltage, fluctuate with the critical dimension variation of transistor features of a wafer, such as gate widths, spacer widths, other features of the transistors, or combinations thereof. The fluctuating performance characteristics of the transistors can lead to poor device performance and low yield. Although existing methods and systems for compensating such performance characteristic variation have been generally adequate for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
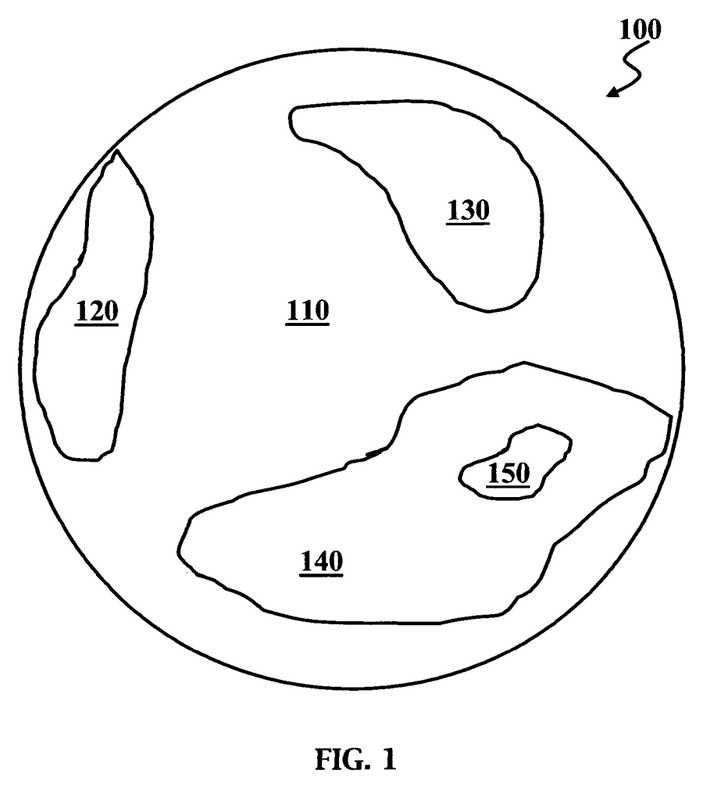
FIG. 1 is a diagrammatic view of a wafer that exhibits critical dimension variations according to various aspects of the present disclosure.

FIG. 1 is a diagrammatic view of a wafer 100 that exhibits critical dimension variations according to various aspects of the present disclosure. The wafer 100 includes an area 110 that includes features having similar critical dimensions, an area 120 that includes features having similar critical dimensions, an area 130 that includes features having similar critical dimensions, an area 140 that includes features having similar critical dimensions, and an area 150 that includes features having similar critical dimensions. Similar critical dimensions may be critical dimensions that fall within a range of critical dimensions or critical dimensions that have some other similar characteristic. In the present example, the similar critical dimensions of each area 110, 120, 130, 140, and 150 vary from the similar critical dimensions of every other area 110, 120, 130, 140, and 150. In another example, the similar critical dimensions of an area may be similar to the similar critical dimensions of another area (for example, the similar critical dimensions of area 120 may be similar to the similar critical dimensions of area 130). The areas 110, 120, 130, 140, and 150 provide a wafer map that shows a variation of critical dimensions in various areas of the wafer 100. The number, size, shape, and location of the areas of the wafer 100 having similar critical dimensions may vary, such that the wafer map illustrating critical dimension variation of the wafer 100 may exhibit any form. In the depicted embodiment, the wafer map depicts a critical dimension variation that is random with no particular trend. In other examples, the map may depict a trend, such as a dual side trend (for example, where a critical dimension variation on the left side of the wafer 100 is similar to a critical dimension variation on the right side of the wafer 100), a tilt trend (for example, where a critical dimension variation increases from the left side to the right side of the wafer 100 or vice versa), a ring-type trend (for example, where a critical dimension variation is within concentric rings on the wafer 100), a center/edge trend (for example, where a critical dimension variation exists between the center of the wafer 100 and the edge of the wafer 100), or other trend.

The wafer 100 includes a plurality of dies, each die having features of an integrated circuit formed therein. Multiple dies are formed within each area 110, 120, 130, 140, and 150. In the depicted embodiment, the wafer 100 has been processed to form transistors for each die, where various patterns of lines have been formed to form gate structures of the transistors, and the critical dimension variations exhibited by the areas 110, 120, 130, 140, and 150 indicate critical dimension variations in the gate structures of the transistors formed in each area 110, 120, 130, 140, and 150. Accordingly, each area 110, 120, 130, 140, or 150 on the wafer 100 includes gate structures that have similar critical dimensions (such as similar gate critical dimensions, similar spacer critical dimensions, other similar critical dimensions, or combinations thereof), while the critical dimensions of the gate structures in each area 110, 120, 130, 140, and 150 vary from one another.

Figure 2:
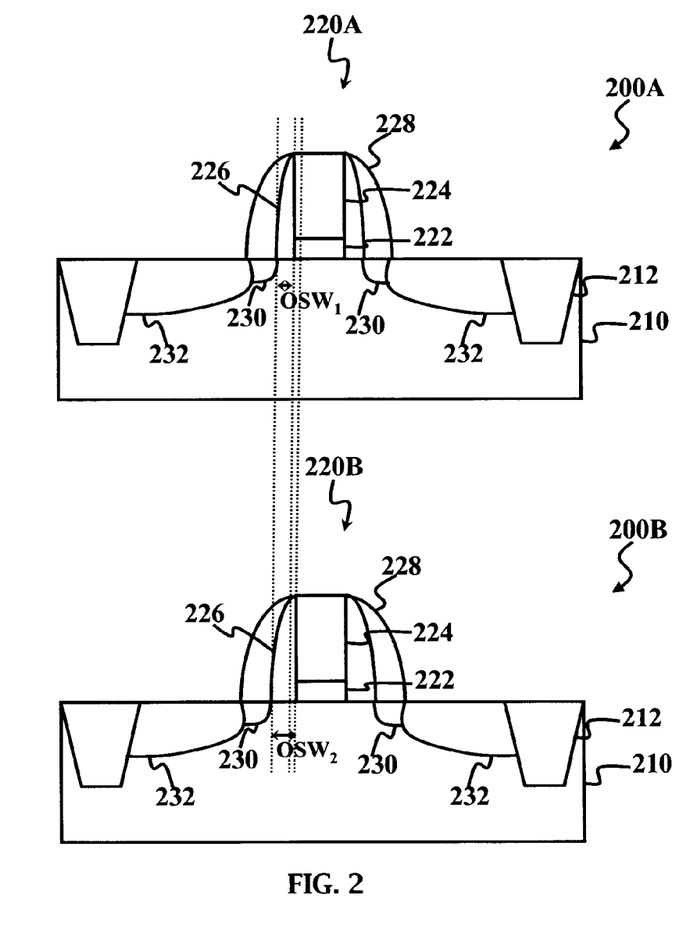
FIG. 2 includes a diagrammatic sectional side view of transistors that include gate structures with varying critical dimensions that may be formed on the wafer of FIG. 1 according to various aspects of the present disclosure.

FIG. 2 includes a diagrammatic sectional side view of transistors that include gate structures with varying critical dimensions that may be formed on the wafer 100 according to various aspects of the present disclosure. More specifically, FIG. 2 illustrates a transistor 200A and a transistor 200B that may be formed on the wafer 100, where transistor 200A has a gate structure with different critical dimensions than a gate structure of the transistor 200B. In the depicted embodiment, the transistor 200A is formed in an area of the wafer 100 different than the transistor 200B. For example, the transistor 200A may be formed in the area 110 of the wafer 100, and the transistor 200B may be formed in the area 120 of the wafer 100. Alternatively, the transistor 200A and transistor 200B may be formed in the same area of the wafer 100. The transistor 200A and transistor 200B may be formed in different dies or may be formed in a same die of the wafer 100.

The transistors 200A and 200B include a substrate 210. In the depicted embodiment, the substrate 210 is a semiconductor substrate including silicon. Alternatively or additionally, the substrate 210 includes another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In yet another alternative, the substrate 210 is a semiconductor on insulator (SOI). The semiconductor substrate 210 may include a doped epi layer, a gradient semiconductor layer, and/or a semiconductor layer overlying another semiconductor layer of a different type, such as a silicon layer on a silicon germanium layer.

An isolation feature 212 is disposed in the substrate 210 to isolate the transistors 200A and 200B from other regions and/or devices of the wafer 100. The isolation feature 212 utilizes isolation technology, such as local oxidation of silicon (LOCOS) and/or shallow trench isolation (STI), to define and electrically isolate the various regions. The isolation feature 212 includes silicon oxide, silicon nitride, silicon oxynitride, other suitable materials, or combinations thereof. The isolation feature 212 is formed by any suitable process. For example, forming an STI includes using a lithography process to expose a portion of the substrate, etching a trench in the exposed portion of the substrate (for example, by using a dry etching and/or wet etching), and filling the trench (for example, by using a chemical vapor deposition process) with one or more dielectric materials. The filled trench may have a multi-layer structure, such as a thermal oxide liner layer filled with silicon nitride or silicon oxide.

The transistor 200A includes a gate structure 220A disposed over the substrate 210, and the transistor 200B includes a gate structure 220B disposed over the substrate 210. The gate structures 220A and 220B may be formed by deposition processes, lithography patterning processes, etching processes, or combinations thereof. The deposition processes include physical vapor deposition (PVD), chemical vapor deposition (CVD), atomic layer deposition (ALD), plasma enhanced CVD (PECVD), remote plasma CVD (RPCVD), molecular organic CVD (MOCVD), sputtering, plating, other suitable methods, or combinations thereof. The lithography patterning processes include resist coating (such as spin-on coating), soft baking, mask aligning, exposure, post-exposure baking, developing the resist, rinsing, drying (such as hard baking), other suitable processes, or combinations thereof. The lithography exposure process may be implemented or replaced by other proper methods such as maskless lithography, electron-beam writing, ion-beam writing, and molecular imprint. The etching processes include dry etching, wet etching, or combinations thereof.

The gate structures 220A and 220B include a gate stack having a gate dielectric 222 and a gate electrode 224. The gate dielectric 222 includes a dielectric material, such as silicon oxide, silicon oxynitride, a high-k dielectric material, other suitable dielectric material, or combinations thereof. Exemplary high-k dielectric materials include $HfO_2$, HfSiO, HfSiON, HfTaO, HfTiO, HfZrO, zirconium oxide, aluminum oxide, hafnium dioxide-alumina ($HfO_2$—$Al_2O_3$) alloy, other suitable high-k dielectric materials, or combinations thereof. The gate dielectric 222 may include more than one layer. For example, the gate dielectric 222 may include an interfacial dielectric layer, such as a silicon oxide layer, disposed over the substrate 210, and a high-k dielectric layer disposed over the interfacial dielectric layer. The gate electrode 224 includes polysilicon and/or a metal including Al, Cu, Ti, Ta, W, Mo, TaN, NiSi, CoSi, TiN, WN, TiAl, TiAlN, TaCN, TaC, TaSiN, other conductive materials, or combinations thereof. The gate stacks of the gate structures 220A and 220B may include numerous other layers, for example, capping layers, interface layers, diffusion layers, barrier layers, hard mask layers, or combinations thereof.

The gate structures 220A and 220B further include spacers, such as offset spacers 226 and main spacers 228. The offset spacers 226 are disposed on sidewalls of the gate stacks of the gate structures 220A and 220B, such as along the gate dielectric 222 and the gate electrode 224; and the main spacers 228 are disposed along the offset spacers 226. The offset spacers 226 and the main spacers 228 include a dielectric material, such as silicon oxide, silicon nitride, silicon oxynitride, other suitable material, or combinations thereof. The offset spacers 226 and main spacers 228 may include a multi-layer structure, such as a multi-layer structure including a silicon nitride layer and a silicon oxide layer.

The transistors 200A and 200B further include source/drain features disposed in the substrate 210. For example, the transistors 200A and 200B have source/drain features that include lightly doped source and drain (LDD) regions 230 and heavily doped source and drain (HDD) regions 232, which are respectively interposed by the gate structures 220A and 220B. The LDD regions 230 and/or HDD regions 232 may be formed by ion implantation, diffusion, and/or annealing processes. In the depicted embodiment, the LDD regions 230 and the HDD regions 232 are formed by ion implantation processes that implant n-type dopants, such as phosphorous or arsenic, or p-type dopants, such as boron of $BF_2$. The source/drain features may include raised source/drain features, such as epitaxial source/drain features.

As noted above, transistor 200A has a gate structure with different critical dimensions than the transistor 200B. More specifically, the gate structure 220A has critical dimensions different than the gate structure 220B. In the depicted embodiment, the gate structure 220A has offset spacers 226 that have a width $OSW_1$ that is smaller than a width $OSW_2$ of the offset spacers 226 of the gate structure 220B. The main spacers 228 of the gate structures 220A and 220B may additionally or alternatively have different widths, and the gate stacks (gate dielectric 222 and gate electrode 224) of the gate structures 220A and 220B may additionally or alternatively have different widths. The varying critical dimensions of the gate structures 220A and 220B can effect performance characteristics of the transistors 200A and 200B. For example, the device performance characteristics of transistors 200A and 200B are typically dependant upon a spatial arrangement of the source features, drain features, and channel. Since the spacer width and gate stack width influences spatial arrangement of the source features, drain features, and channel of the transistors 200A and 200B (for example, gate width and offset spacer width 226 may dictate width or length of the channel disposed between the source features and drain features), and the critical dimensions of the gate structures of transistors 200A and 200B vary from one another, the transistor 200A that includes the gate structure 220A will have different performance characteristics than the transistor 200B that includes the gate structure 220B. For example, the transistor 200A that includes the gate structure 220A may operate at a different threshold voltage as compared to the transistor 200B that includes the gate structure 220B. In another example, the transistor 200A that includes the gate structure 220A may exhibit a different saturation current as compared to the transistor 200B that includes the gate structure 220B. Such critical dimension variation, and thus device performance variation, is exacerbated as device technology nodes continue to decrease and device technology moves towards greater wafer sizes (for example, 450 mm).

To compensate for such critical dimension variations of wafers during processing, critical dimensions of various features of the wafer are inspected during processing and fed forward to adjust or tune a processing recipe for a subsequent process on the wafer or a subsequently processed wafer, or fed back to adjust or tune a processing recipe for a subsequently processed wafer. The critical dimensions are measured at various positions on the wafer using a suitable critical dimension (CD) metrology instrument such as CD-scanning electron microscopy (CD-SEM). Alternatively, the metrology instrument may include cross-section SEM (X-SEM), transmission electron microscopy (TEM), atomic force microscopy (AFM), or other suitable technique. The number of samples taken and location of the samples may vary. For example, during processing, the gate structures of the wafer 100, such as gate structures 220A and 220B, are inspected to determine various critical dimensions of the gate structures, and thus critical dimensions of the wafer 100. The critical dimensions determined may include a critical dimension of the gate stacks of the gate structures (such as a width of the gate electrode 224), a critical dimension of the offset spacers of the gate structures (such as a width of the offset spacers 226), and a critical dimension of the main spacers of the gate structures (such as a width of the main spacers 228). Various metrics (such as average, mean, deviation (for example, 3-sigma standard deviation), and range) may then be used to characterize the critical dimensions on the wafer 100 as a whole, or a variation of critical dimensions across the wafer 100, including from die to die. Such metrics result in the wafer map illustrating the various areas 110, 120, 130, 140, and 150 of the wafer 100 having varying critical dimensions. The various areas 110, 120, 130, 140, and 150 of the wafer 100 indicate areas of the wafer 100 where the devices will have varying performance characteristics.

As noted above, the information obtained from characterizing the critical dimensions may be fed forward to adjust or tune a processing recipe for a subsequent process on the wafer or a subsequently processed wafer, or fed back to adjust or tune a processing recipe for a subsequently processed wafer. For example, in the depicted embodiment, the critical dimensions of the offset spacers (such as offset spacers 226) of the gate structures of the wafer 100 were evaluated to adjust the ion implantation process used to form the LDD regions (such as LDD regions 230), and the critical dimensions of the main spacers (such as main spacers 228) of the gate structures of the wafer 100 were evaluated to adjust the ion implantation process used to form the HDD regions (such as HDD regions 232) of the wafer 100. Such compensation implements a single process (here, an ion implantation process) that is adjusted based on a single process parameter. For example, the ion implantation process used to form the LDD regions, such as LDD regions 230, is tuned based on the critical dimension variation of the offset spacers of the wafer, such as offset spacers 226. Similarly, the ion implantation process used to form the HDD regions, such as HDD regions 232, is tuned based on the critical dimension variation of the main spacers of the wafer, such as main spacers 230. However, as further noted above, critical dimension variation, and thus device performance variation, is exacerbated as device technology nodes continue to decrease and device technology moves towards greater wafer sizes (for example, 450 mm). It has been observed that as critical dimension variations across the wafer increase, such single process parameter, single process compensations cannot optimally minimize device performance variation within wafer, wafer to wafer, and lot to lot. In other words, despite conventional process tuning measures, device performance variation of a wafer continues to increase as technology nodes decrease.

Figure 3:
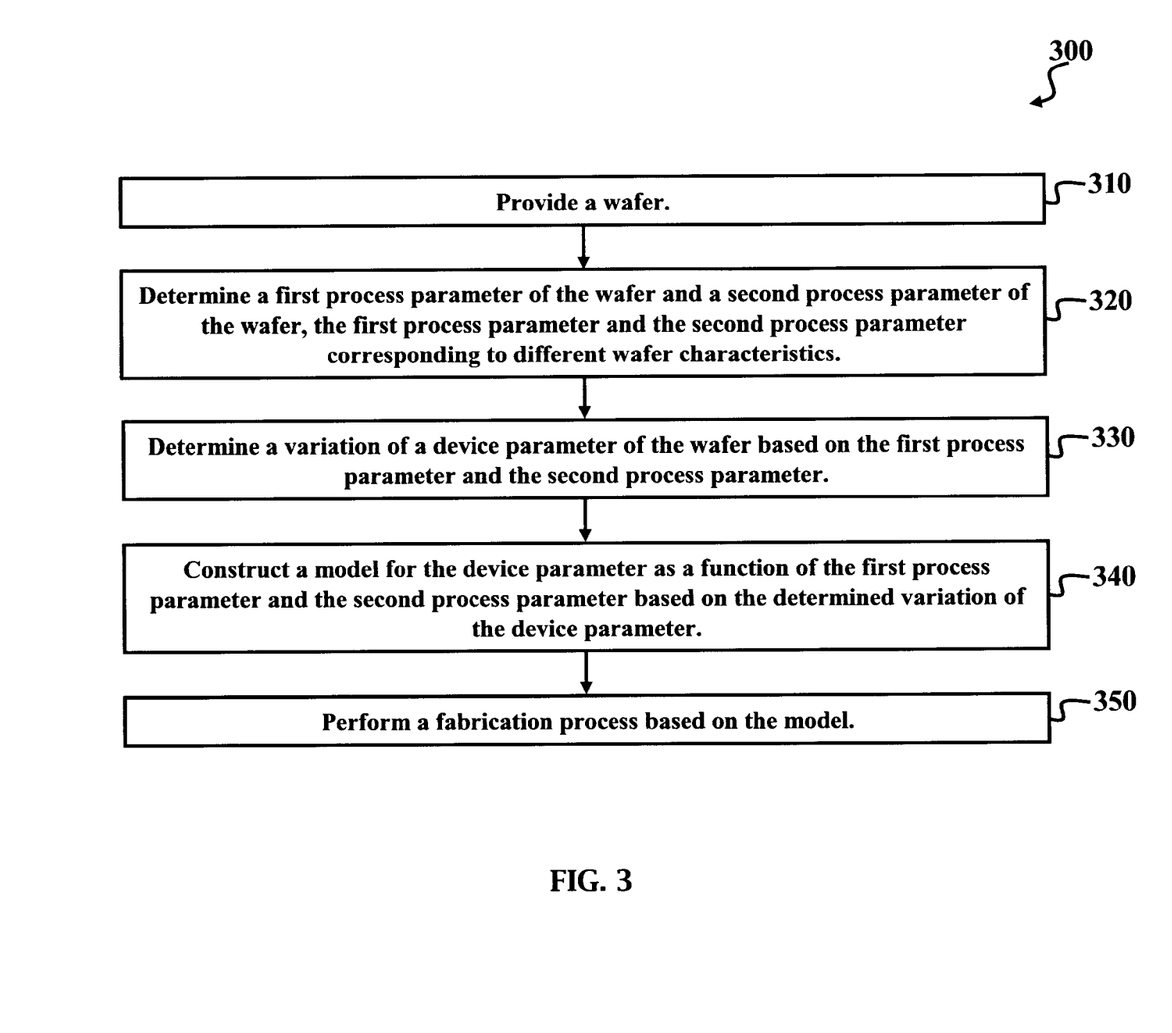
FIG. 3 is flow chart of a method that compensates for variations in a wafer that during integrated circuit device fabrication according to various aspects of the present disclosure.

FIG. 3 is flow chart of a method 300 that compensates for process variations that arise during integrated circuit device fabrication according to various aspects of the present disclosure. The method 300 uses more than one process parameter to determine, adjust, or tune an integrated circuit fabrication process. By using more than one process parameter to determine, adjust, or tune the integrated circuit fabrication process, the method 300 improves process variation compensation. More specifically, the method 300 evaluates more than one process parameter to determine, tune, or adjust a fabrication process so that variation of device performance of a wafer is minimized. Different embodiments may have different advantages, and no particular advantage is necessarily required of any embodiment. Additional steps can be provided before, during, and after the method 300, and some of the steps described can be replaced or eliminated for additional embodiments of the method 300.

At block 310, a wafer is provided. The wafer has been processed to form various integrated circuit device features. For example, the wafer has been processed to form various line patterns that combine to form various gate structures of devices, such as gate structures of transistors. The gate structures for the transistors may be similar to the gate structures 220A and 220B of transistors 200A and 200B, respectively, illustrated in FIG. 2. For example, the gate structures include a gate stack that has a gate dielectric and a gate electrode, offset spacers, and main spacers. Each of the gate structures may interpose a source region and a drain region. In the present example, the gate structures interpose LDD features respectively disposed in the source region and the drain region.

During processing, the wafer undergoes one or more inspection processes to determine various process parameters of the wafer. The process parameters are parameters associated with the various integrated circuit fabrication processing stages used to carry out the fabrication of an integrated circuit device. More specifically, the process parameters measure physical characteristics of the integrated circuit device at various fabrication processing stages. In the present example, the process parameters measure physical characteristics of a transistor, such as critical dimensions of the transistor. For example, the process parameters include offset spacer width critical dimension (OSW_CD), main spacer width critical dimension (MSW_CD), polysilicon region critical dimension (POLY_CD), active region critical dimension (OD_CD), shallow trench isolation step height (STI_SH), gate oxide thickness, pocket implant dose (PKT_IMP), other suitable parameters, or combinations thereof. These process parameters merely serve as examples, and additional process parameters may be considered but are not mentioned herein for the sake of simplicity.

At block 320, a first process parameter of the wafer and a second process parameter of the wafer is determined. The first process parameter and the second process parameter correspond to different wafer characteristics. In the present example, the first process parameter corresponds with offset spacer width critical dimension, and the second process parameter corresponds with main spacer width critical dimension. Determining the first and second process parameters of the wafer thus includes evaluating each gate structure's corresponding first process parameter (offset spacer width critical dimension) and second process parameter (main spacer width critical dimension). In other examples, additional and/or other process parameters of the wafer may be determined, such as those described above. Due to process variations, the first and second process parameters may vary across the wafer, which can lead to device performance variation across the wafer. For example, varying offset spacer width critical dimensions and main spacer width critical dimensions result in varying spatial arrangements of the source features, drain features, and channel of the transistors of the wafer, which can lead to variations in saturation drain current and threshold voltage of the transistors of the wafer.

At block 330, a variation of a device parameter of the wafer based on the first process parameter and the second process parameter is determined. The device parameter is a parameter that measures an electrical characteristic of an integrated circuit device. In the present example, the device parameter is a saturation drain current ($I_{dsat}$) of a transistor. Alternatively, the device parameter may be a threshold voltage ($V_t$) of the transistor. Other examples of the device parameter include a trans-conductance ($G_m$) or trans-resistance ($R_m$) of a transistor. These electrical device parameters merely serve as examples, and additional device parameters may be considered but are not mentioned herein for the sake of simplicity. Alternatively, the device parameter may be expressed in percentage terms as a measurement of uniformity with respect to one of the above electrical parameters. In furtherance of the present example, the variation of the device parameter of the wafer based on the first process parameter and the second process parameter is determined based on various zones of the wafer. For example, an edge zone and a center zone of the wafer is defined where a variation of the device parameter of the wafer in the edge zone is determined based on the first and second process parameters observed in the edge zone, and a variation of the device parameter of the wafer in the center zone is determined based on the first and second process parameters observed in the center zone.

Figure 4:
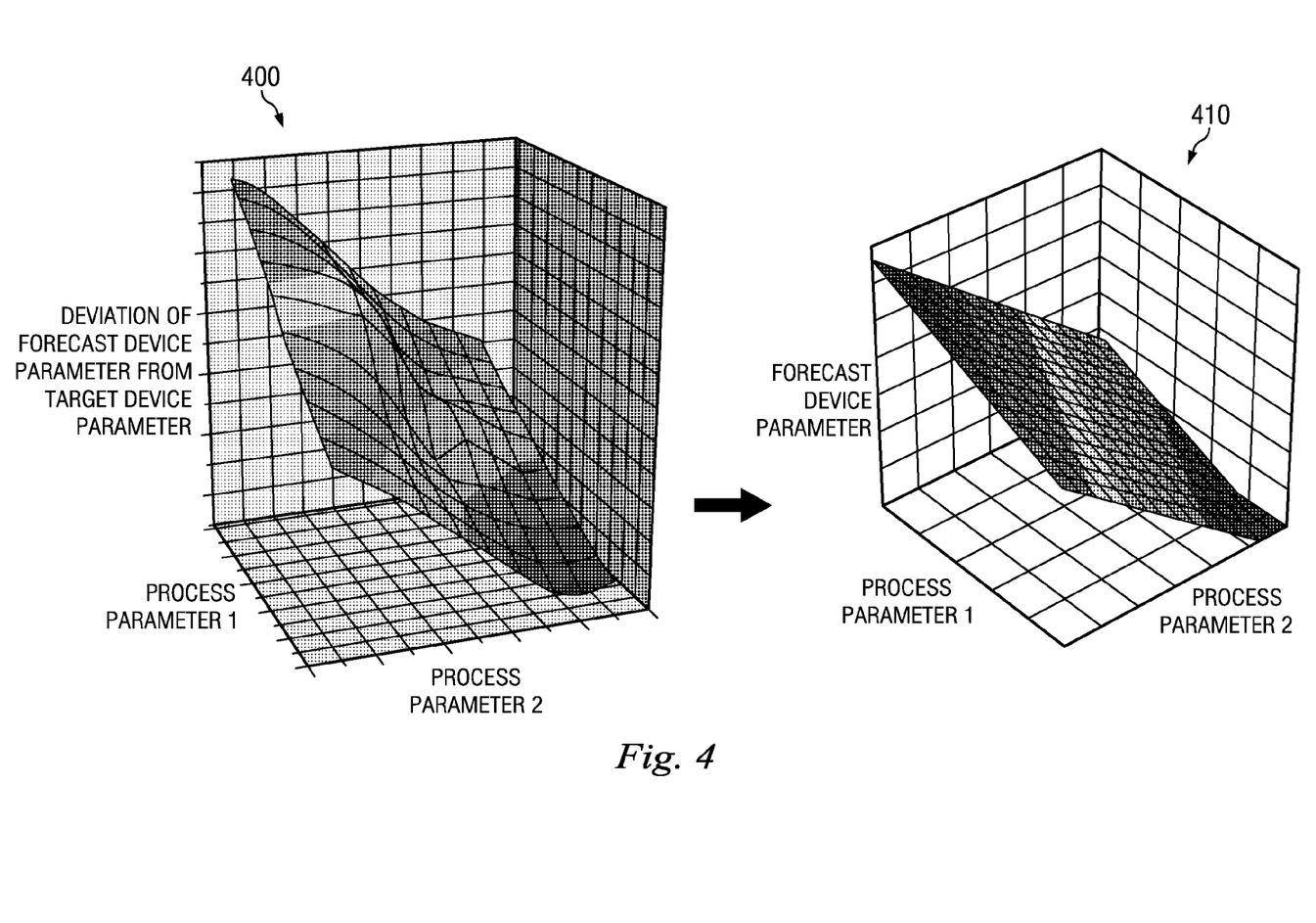
FIG. 4 includes graphs representing data generated during integrated circuit processing, or representing information derived from that data, that may be used in the method of FIG. 3 according to various aspects of the present disclosure.

FIG. 4 includes graphs representing data generated during integrated circuit processing, or representing information derived from that data, that can be used to determine a variation of a device parameter of a wafer based on the first process parameter and the second process parameter, according to various aspects of the present disclosure. The graphs in FIG. 4 are provided for illustration purposes only, and the method 300 can be performed solely with the generated data or derived information, without generating graphs. In the present example, as noted above, the first process parameter (process parameter 1) corresponds with offset spacer width critical dimension, the second process parameter corresponds with main spacer width critical dimension, and the device parameter corresponds with saturation drain current. Further, as noted above, each gate structure has a corresponding offset spacer width critical dimension and main spacer width critical dimension. A forecast saturation drain current can thus be determined for each transistor of the wafer based on each gate structure's corresponding offset spacer width critical dimension and main spacer width critical dimension. A deviation of each transistor's forecast saturation drain current from a target device parameter, here a target saturation drain current, can then be determined. Such deviation may vary over the wafer. For example, in FIG. 4, a graph 400 illustrates a variation of a deviation of a forecast device parameter from a target device parameter of a wafer based on the first process parameter and the second process parameter. In the present example, process parameter 1 is the offset spacer width critical dimension, process parameter 2 is main spacer width critical dimension, and deviation of the forecast device parameter from the target parameter is a deviation of the forecast saturation drain current from a target saturation drain current. As illustrated, such deviation varies over the wafer. From the graph 400 (or the data represented by the graph 400), a graph 410 can be derived that minimizes variation of the forecast device parameter. The graph 410 illustrates a variation of the forecast device parameter of the wafer based on the first process parameter and the second process parameter. In the present example, process parameter 1 is offset spacer width critical dimension, process parameter 2 is main spacer width critical dimension, and forecast device parameter is the saturation drain current. In furtherance of the present example, where various zones of the wafer are defined, such as the edge zone and the center zone, the graphs 400 and 410 may be associated with the edge zone of the wafer, and other graphs may be generated that are associated with the center zone of the wafer, such that variation of the forecast device parameter is respectively minimized in both the center zone and the edge zone.

At block 340, a model for the device parameter as a function of the first process parameter and the second process parameter is constructed based on the determined variation of the device parameter. For example, because a correlation exists between a desired device parameter (or device parameter of interest) and the process parameters associated with the fabrication processing stages that are performed, a mathematical model can be constructed to express the device parameter as a function of the process parameters. As an example, the modeling equation may be expressed as follows:

$$DP = a_1*P_1 + a_2*P_2 + \ldots + a_n*P_n b \quad (1)$$

where DP represents the device parameter; $P_1$ through $P_n$ each represent a different process parameter; $a_1$, $a_2$, and $a_n$ are respective linear coefficients of the process parameters $P_1$ through $P_n$; and b is a constant. In this example, the device parameter DP has a linear relationship with the process parameters $P_1$ through $P_n$. If such mathematical model is implemented in the present example, where the device parameter is a saturation drain current ($I_{dsat}$) for a transistor, and the process parameters include an offset spacer width critical dimension (OSW_CD) and a main spacer width critical dimension (MSW_CD), the mathematical model is as follows:

$$I_{dsat} = a_1*OSD\_CD + a_2*MSW\_CD + b \quad (2)$$

In furtherance of the present example, the values of $a_1$, $a_2$, and b are derived from the determined variation of the device parameter based on the first process parameter and the second process parameter, such as that illustrated in graph 410 of FIG. 4. Another example of the modeling equation may be expressed as follows:

$$DP = f_1(P_1) + f_2(P_2) + \ldots + f_n(P_n) + b \quad (3)$$

In this example, each of the functions $f_1(P_1)$ through $f_n(P_n)$ may be linear or non-linear. As such, the device parameter DP may have a non-linear relationship with the process parameters $P_1$ through $P_n$. Where various zones of the wafer are defined, a model for the device parameter as a function of the first process parameter and the second process parameters is constructed based on the determined variation of the device parameter associated with each respective zone. For example, where the edge zone and the center zone of the wafer are defined, a model for the device parameter as a function of the first and second process parameters is constructed based on the determined variation of the device parameter in the edge zone, and another model for the device parameter as a function of the first and second process parameters is constructed based on the determined variation of the device parameter in the center zone.

At block 350, a fabrication process is performed based on the model. For example, the first process parameter and the second process parameter of the wafer are used to update the model to determine a forecast device parameter. The first process parameter and the second process parameter may be an average, median, mean, deviation (for example, 3-sigma standard deviation), range, or other suitable metric. The forecast device parameter may then be compared to the target device parameter, and a process recipe of the fabrication process is determined, adjusted, or tuned based on the comparison. The fabrication process may then be performed on the wafer according to the process recipe. Where various zones of the wafer are defined, the fabrication process is tuned in the various zones. For example, where the edge zone and the center zone of the wafer are defined, the model associated with the edge zone is updated with first and second process parameters associated with the edge zone to determine a forecast device parameter for the edge zone, and the model associated with the center zone is updated with first and second process parameters associated with the center zone to determine a forecast device parameter for the center zone. The forecast device parameters respectively associated with the center zone and the edge zone are then compared to a target device parameter, and a process recipe of the fabrication process is determined, adjusted, or tuned based on the comparison. By evaluating the forecast device parameter at various zones of the wafer, the process recipe of the fabrication process can thus be tuned to achieve minimal device performance variation across the wafer, thereby providing improved within wafer uniformity of the device parameter. In an example, the wafer is part of a wafer lot, and a fabrication process may be performed on each wafer in the wafer lot according to the process recipe. In another example, measured process parameters of a subsequently processed wafer (such as a subsequently processed wafer in a wafer lot) are used to update the model to determine the forecasted device parameter for the subsequently processed wafer and then determine, adjust, or tune a process recipe for the fabrication process performed on the subsequently processed wafer. Measured process parameters of each subsequently processed wafer may be used to update the model and determine, adjust, or tune a process recipe for each subsequently processed wafer. In yet another example, a model is constructed for each processed wafer, such that each processed wafer uses a constructed model to determine, adjust, or tune a process recipe of a fabrication process performed thereon.

In the present example, the offset spacer width critical dimensions and the main spacer width critical dimensions of the wafer may be used to update the model, such as the model provided in Equation (2) above. For example, the offset spacer width critical dimensions of the gate structures of the wafer and the main spacer width critical dimensions of the gate structures of the wafer may be evaluated to determine a representative offset spacer width critical dimension and representative main spacer width critical dimension that can be used to update the model provided in Equation (2) above. The representative offset spacer width critical dimension and the representative main spacer width dimension may be an average, median, mean, deviation (for example, 3-sigma standard deviation), range, or other suitable metric of the respective offset spacer width critical dimensions of the gate structures of the wafer and the main spacer width critical dimensions of the gate structures. Updating the model with the representative offset spacer width critical dimension and the main spacer width critical dimension determines a forecast saturation drain current for the wafer, which may then be compared to a target saturation drain current, for example, to determine a deviation of the forecast saturation drain current from the target saturation drain current. In an example, a process recipe of an ion implantation process used to form source and drain features of the wafer, such as HDD features, is determined, adjusted, or tuned based on the comparison of the forecasted saturation drain current to the target saturation drain current. An ion implantation process is then performed on the wafer according to the process recipe, such that the source and drain features are formed on the wafer. In an example, the wafer is part of a wafer lot, and the process recipe of the ion implantation process may be performed on each wafer in the wafer lot to form the source and drain features, such as the HDD features, on each wafer. In another example, a representative offset spacer width critical dimension and a representative main spacer width critical dimension of a subsequently processed wafer (such as a subsequently processed wafer in a wafer lot) are used to update the model to determine the forecast saturation drain current for the subsequently processed wafer and then determine, adjust, or tune a process recipe for the ion implantation process performed on the subsequently processed wafer. In yet another example, a model is constructed for each processed wafer, such that each processed wafer uses a constructed model to determine, adjust, or tune a process recipe of an ion implantation process performed thereon.

Figure 5:
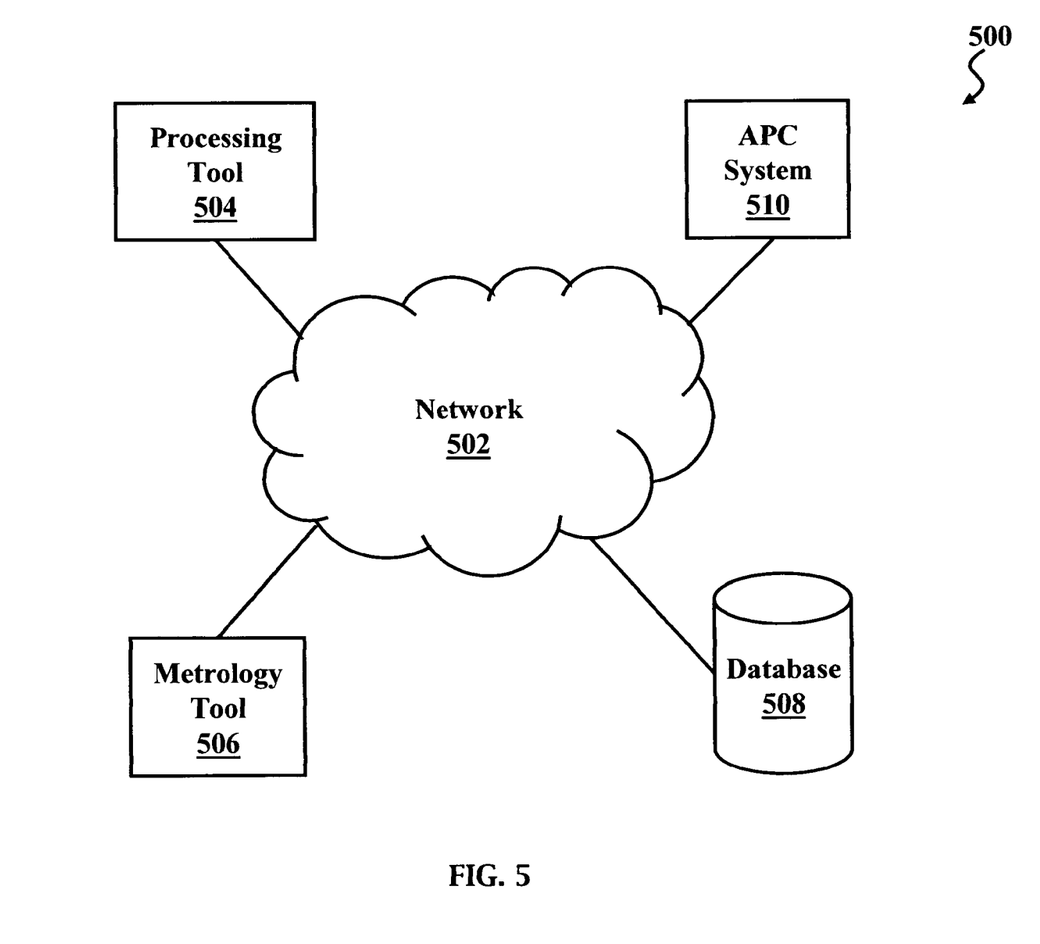
FIG. 5 is a diagram of an integrated circuit (IC) device fabrication system that may implement the method of FIG. 3 according to various aspects of the present disclosure.

FIG. 5 is a diagram of an integrated circuit (IC) device fabrication system 500 according to various aspects of the present disclosure. The system 500 may implement a semiconductor manufacturing process that fabricates a plurality of wafers. During fabrication, the system 500 may implement the method 300 of FIG. 3 to compensate for process variations. The system 500 includes various entities that are connected by a network 502. The network 502 may be a single network or a variety of different networks, such as an intranet and the Internet, and may include both wired and wireless communication channels. Each entity may interact with the other entities and may provide services to and/or receive services from the other entities via the network 502.

In the depicted embodiment, the entities of the system 500 include a processing tool 504, a metrology tool 506, a database 508, and an advanced process control (APC) system 510. The system 500 may include more than one processing tool 504, metrology tool 506, database 508, and/or APC system 510. In the depicted embodiment, the processing tool 504 is an ion implantation tool. A wafer can be placed into the implantation tool and subjected to an ion implantation process, such that a doped feature is formed on the wafer. The process tool 504 may include a plurality of sensors for monitoring pressure, gas flows, time, temperature, impurity levels, and/or other parameters. The system 500 may further include other processing tools, such as deposition tools, annealing tools, etching tools, electroplating tools, furnaces, other suitable tools.

The metrology tool 506 includes any type of metrology tool that measures various characteristics (and/or details) of the integrated circuit device as it is being fabricated. The measurement data may include wafer results such as wafer parameters measured by the metrology tool 506, such as sheet resistance, reflectivity, stress, particle density, and critical dimension. In the depicted embodiment, the metrology tool 506 measures critical dimensions of various features formed on the wafer during processing. The metrology tool 506 may classify defects and features of the wafer. The metrology tool 506 may include electrical, optical, and/or analytical tools, such as microscopes (for example, scanning electron microscopes and/or optical microscopes), micro-analytical tools, line width measurement tools, mask and reticle defect tools, particle distribution tools, surface analysis tools, stress analysis tools, resistivity and contact resistance measurement tools, mobility and carrier concentration measurement tools, junction depth measurement tools, film thickness tools, gate oxide integrity test tools, C-V measurement tools, focused ion beam (FIB), laser surface defect scanners, residual gas analyzers, process tool particle counters, and/or a variety of other metrology tools. The metrology tool may include an after development inspection (ADI) metrology tool and/or an after etching inspection (AEI) metrology tool.

The metrology tool 506 can send the measurement data to the database 508 for storing. In an example, the measurement data is provided directly to the APC system 510. The database 508 may include a tool database, a configuration database, a cross-tool analysis database, other suitable database, or combinations thereof. The configuration database may store configuration information, process control models, and process control strategies for the process tool 504. For example, the configuration information may be used to adjust a process parameter such as implantation energy, chamber pressure, and/or process time. Optimizations and other adjustments may be made to the process tool 504 via the network 502. The cross-tool analysis database may include information obtained from multiple process tools 504. Such information may be used to analyze the performance, yield rate, and other data of each process tool with that of the other process tools. It is understood that aspects of the present disclosure may be implemented within the APC system 510 to analyze information either from the metrology tool 506 or the database 508 or other proper equipment in the system 500.

The APC system 510 analyzes information from the metrology tool 506, the database 508, other entities of the system 500, or a combination thereof. The APC system 510 includes a computer, which can be a conventional, commercially-available computer or any other suitable computer hardware. The hardware of the APC system 510 includes a processor and a memory. The memory stores a computer program that is executed by the processor, and that causes the computer to control various aspects of the process tool 504. The computer is operable to perform actions including manipulating information (including manipulating information using a model), receiving information, storing information, and transferring information. In an example, the computer includes multiple computers. The computer may include equipment or code embedded in a process tool, such as the process tool 504. The computer may further include one or multiple user interfaces. In the depicted embodiment, the APC system 510 includes one or more computers encoded with computer programs that construct a model for a device parameter as a function of more than process parameter as described above with reference to the method 300 of FIG. 3. For example, the APC system 510 analyzes more than one process parameter to construct a model for a device parameter and determine a process recipe for an ion implantation process, such as that performed by the process tool 504.

Further, the present embodiments can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

The present disclosure provides for many different embodiments. In an example, a method includes determining a first process parameter of a wafer and a second process parameter of the wafer, the first process parameter and the second process parameter corresponding to different wafer characteristics; determining a variation of a device parameter of the wafer based on the first process parameter and the second process parameter; constructing a model for the device parameter as a function of the first process parameter and the second process parameter based on the determined variation of the device parameter of the wafer; and performing a fabrication process based on the model. The device parameter corresponds to an electrical characteristic of the wafer, and the first process parameter and the second process parameter correspond to respective physical characteristics of the wafer. The electrical characteristic may include one of saturation drain current, threshold voltage, trans-conductance, trans-resistance, saturation drain current uniformity, threshold voltage uniformity, trans-conductance uniformity, and trans-resistance uniformity; and the physical characteristics may include one of active region critical dimension, shallow trench isolation step height, polysilicon region critical dimension, offset spacer width critical dimension, main spacer width critical dimension, rapid thermal annealing temperature, gate oxide thickness, and pocket implant dose. The fabrication process may be an ion implantation process.

Performing the fabrication process based on the model may include updating the model to determine a forecasted device parameter; determining a process recipe for the fabrication process based on the forecasted device parameter; and performing the fabrication process according to the process recipe. Determining the process recipe for the fabrication process based on the forecasted device parameter may include evaluating a difference between the forecasted device parameter and a target device parameter; and adjusting the process recipe based on the difference. In an example, updating the model to determine the forecasted device parameter may include updating the model with the first process parameter of the wafer and the second process parameter of the wafer; and the performing the fabrication process according to the process recipe may include performing the fabrication process on the wafer. In an example, the wafer is one of a plurality of wafers of a wafer lot; and the performing the fabrication process according to the process recipe may include performing the fabrication process on each of the plurality of wafers of the wafer lot. In an example, the updating the model to determine the forecasted device parameter may include updating the model with a first process parameter of another wafer and a second process parameter of the another wafer; and the performing the fabrication process according to the process recipe may include performing the fabrication process on the another wafer.

In another example, a method includes performing a first process and a second process on a wafer, such that the wafer includes a first set of features having a first set of critical dimensions and a second set of features having a second set of critical dimensions; determining a variation of a device performance characteristic based on the first set of critical dimensions of the wafer and the second set of critical dimensions of the wafer; constructing a model for the device performance characteristic based on the first set of critical dimensions and the second set of critical dimensions, wherein the model minimizes the variation of the device performance characteristic; and determining a process recipe for a fabrication process based on the model. The method may further include performing the fabrication process on the wafer according to the process recipe. In an example, the wafer is one of a plurality of wafers of a wafer lot and the method may further include performing the fabrication process according to the process recipe on each of the plurality of wafers of the wafer lot.

The device performance characteristic may include one of saturation drain current, threshold voltage, trans-conductance, trans-resistance, saturation drain current uniformity, threshold voltage uniformity, trans-conductance uniformity, and trans-resistance uniformity; and the first set of critical dimensions and the second set of critical dimensions may include one of active region critical dimension, shallow trench isolation step height, polysilicon region critical dimension, offset spacer width critical dimension, main spacer width critical dimensions, rapid thermal annealing temperature, gate oxide thickness, and pocket implant dose. In an example, the fabrication process is an ion implantation process, the first set of critical dimensions are offset spacer width critical dimensions, the second set of critical dimensions are main spacer width critical dimensions, and the device performance characteristic is one of saturation drain current and threshold voltage. In an example, determining the process recipe for the fabrication process based on the model may include updating the model with a first critical dimension and a second critical dimension, thereby determining a forecasted device performance characteristic; evaluating a difference between the forecasted device performance characteristic and a target device performance characteristic; and determining the process recipe based on the difference.

In yet another example, a system includes a process tool for performing first fabrication process, a second fabrication process, and a third fabrication process; a metrology tool coupled to the process tool, wherein the metrology tool measures a first process parameter of the first fabrication process and a second process parameter of the second fabrication process; and an advanced process control module coupled to the process tool and the metrology tool. The advanced process control module constructs a model for a device parameter, such that the device parameter is a function of the first process parameter and the second process parameter; and determines a process recipe for the third fabrication process based on the model, wherein the process tool performs the third fabrication process according to the process recipe. The advanced process control module constructs the model that minimizes device performance variation of a wafer. The device parameter may include one of saturation drain current, threshold voltage, trans-conductance, trans-resistance, saturation drain current uniformity, threshold voltage uniformity, trans-conductance uniformity, and trans-resistance uniformity; and the process parameters may include one of active region critical dimension, shallow trench isolation step height, polysilicon region critical dimension, offset spacer width critical dimension, main spacer width critical dimension, rapid thermal annealing temperature, gate oxide thickness, and pocket implant dose. The third fabrication process may be an ion implantation process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    determining a first physical characteristic of a wafer and a second physical characteristic of the wafer, the first physical characteristic and the second physical characteristic corresponding to different physical characteristics and each selected from the group of physical characteristics consisting of an offset spacer width critical dimension on the wafer and a main spacer width critical dimension on the wafer;
    determining a variation of a device performance parameter of the wafer based on the first physical characteristic and the second physical characteristic, wherein the device performance parameter is one of saturation drain current and threshold voltage;
    constructing a model for the device performance parameter as a function of the first physical characteristic and the second physical characteristic based on the determined variation of the device performance parameter of the wafer; and
    performing a fabrication process based on the model.

2. The method of claim 1 wherein the performing the fabrication process based on the model includes:
    updating the model to determine a forecasted device performance parameter;
    determining a process recipe for the fabrication process based on the forecasted performance device parameter; and
    performing the fabrication process according to the process recipe.

3. The method of claim 2 wherein the determining the process recipe for the fabrication process based on the forecasted device performance parameter includes:
    evaluating a difference between the forecasted device performance parameter and a target device performance parameter; and
    adjusting the process recipe based on the difference.

4. The method of claim 1 wherein:
    the first and second physical characteristics include offset spacer width critical dimension and main spacer width critical dimension respectively.

5. The method of claim 2 wherein:
    the updating the model to determine the forecasted device performance parameter includes updating the model with the first physical characteristic of the wafer and the second physical characteristic of the wafer; and the performing the fabrication process according to the process recipe includes performing the fabrication process on the wafer.

6. The method of claim 5 wherein:
the wafer is one of a plurality of wafers of a wafer lot; and
the performing the fabrication process according to the process recipe includes performing the fabrication process on each of the plurality of wafers of the wafer lot.

7. The method of claim 2 wherein:
the updating the model to determine the forecasted device performance parameter includes updating the model with a first physical characteristic of another wafer and a second physical characteristic of the another wafer; and
the performing the fabrication process according to the process recipe includes performing the fabrication process on the another wafer.

8. The method of claim 1 wherein the performing the fabrication process based on the model includes performing an ion implantation process.

9. A method comprising:
performing a first process and a second process on a wafer, such that the wafer includes a first set of features having a first set of critical dimensions and a second set of features having a second set of critical dimensions wherein the first set of critical dimensions are offset spacer width critical dimensions, and the second set of critical dimensions are main spacer width critical dimensions;
determining a variation of a device performance characteristic based on the first set of critical dimensions of the wafer and the second set of critical dimensions of the wafer, and wherein the device performance characteristic is one of saturation drain current and threshold voltage;
constructing a model for the device performance characteristic based on the first set of critical dimensions and the second set of critical dimensions, wherein the model minimizes the variation of the device performance characteristic; and
determining a process recipe for a fabrication process based on the model wherein the determining the process recipe for the fabrication process based on the model includes determining a process recipe for an ion implantation process.

10. The method of claim 9 further including performing the fabrication process on the wafer according to the process recipe.

11. The method of claim 10 wherein the wafer is one of a plurality of wafers of a wafer lot and further including performing the fabrication process according to the process recipe on each of the plurality of wafers of the wafer lot.

12. The method of claim 9 wherein the determining the process recipe for the fabrication process based on the model includes:
updating the model with a first critical dimension and a second critical dimension, thereby determining a forecasted device performance characteristic;
evaluating a difference between the forecasted device performance characteristic and a target device performance characteristic; and
determining the process recipe based on the difference.

13. A system comprising:
a process tool for performing a first fabrication process, a second fabrication process, and a third fabrication process;
a metrology tool coupled to the process tool, wherein the metrology tool measures a first physical characteristic of the first fabrication process and a second physical characteristic of the second fabrication process, wherein the first physical characteristic is an offset spacer width critical dimension, and the second physical characteristic is a main spacer width critical dimension; and
an advanced process control module coupled to the process tool and the metrology tool, wherein the advanced process control module is configured to:
construct a model for a device parameter, such that the device parameter is a function of the first physical characteristic and the second physical characteristic, and
determine a process recipe for the third fabrication process based on the model, wherein the process tool performs the third fabrication process according to the process recipe.

14. The system of claim 13 wherein:
the device parameter includes one of saturation drain current, threshold voltage, trans-conductance, trans-resistance, saturation drain current uniformity, threshold voltage uniformity, trans-conductance uniformity, and trans-resistance uniformity.

15. The system of claim 13 wherein the third fabrication process is an ion implantation process.

16. The system of claim 13 wherein the advanced process control module constructs the model that minimizes device performance variation of a wafer.

* * * * *